United States Patent Office 2,765,299
Patented Oct. 2, 1956

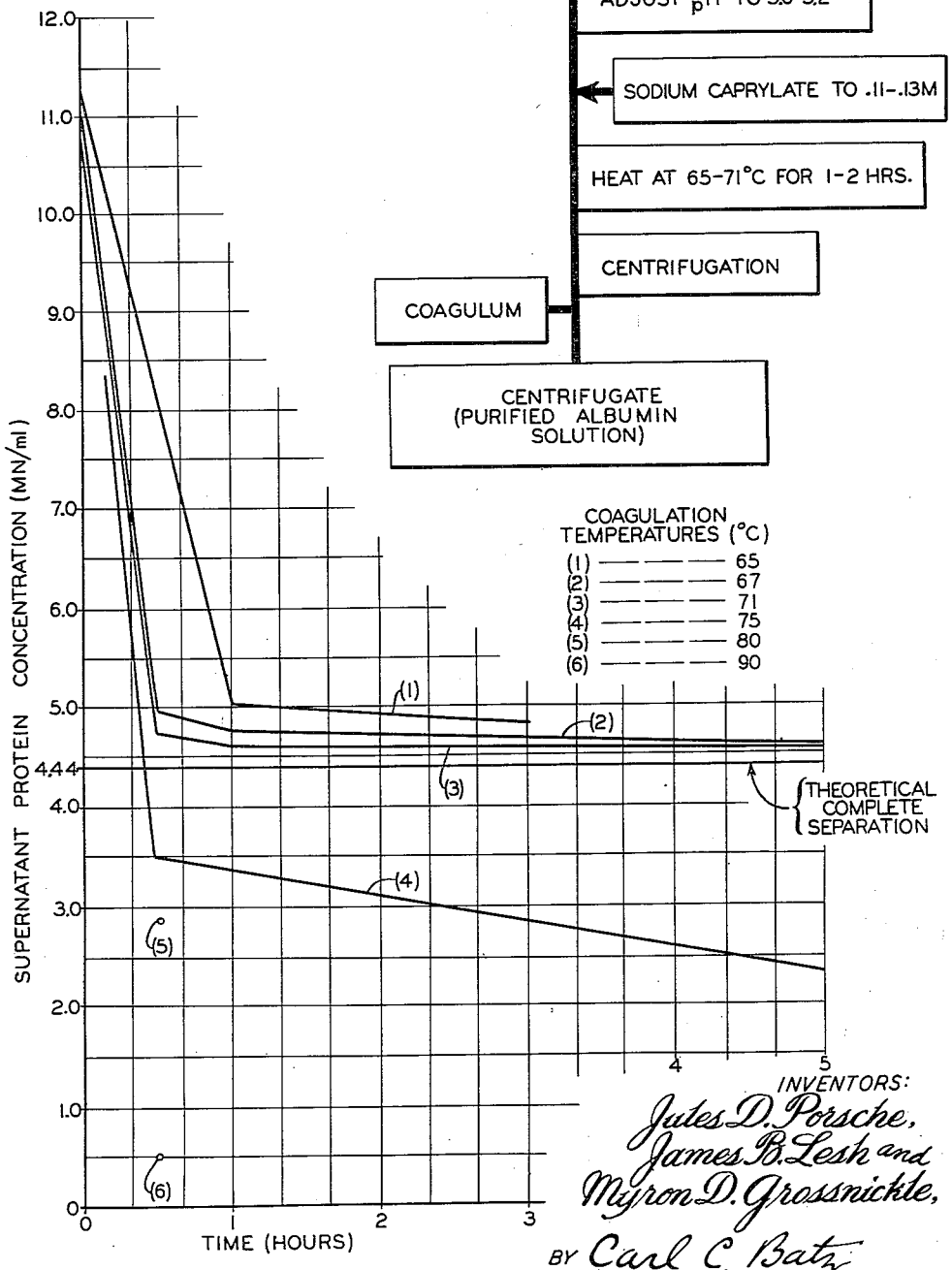

---

2,765,299

RECOVERY OF SERUM ALBUMIN

Jules D. Porsche, Clarendon Hills, James B. Lesh, Chicago, and Myron D. Grossnickle, Homewood, Ill., assignors to Armour and Company, Chicago, Ill., a corporation of Illinois Application June 27, 1952, Serial No. 295,912

8 Claims. (Cl. 260—122)

This invention relates to the recovery of serum or blood albumin. More particularly, this invention relates to the separation of serum albumin from the other protein constituents of mammalian blood. The method of this invention has particular utility in recovering purified serum albumin in high yields from the whole blood, plasma, or serum of cattle, hogs, and sheep. As used herein, serum albumin and blood albumin are intended to refer to the same constituent of mammalian blood, regardless of whether the product is obtained directly from whole blood, plasma, or serum.

It is a general object of this invention to provide a commercially feasible process for the recovery of serum albumin from the other protein constituents of mammalian blood. It is a further object of this invention to provide such process which is applicable to the direct recovery of serum albumin from the whole blood, plasma, and serum of mammals. It is a more specific object of this invention to develop a process of the character indicated which achieves a clean separation of the serum albumin from the other protein constituents of mammalian blood in a single separation cycle carried out in a minimum of time. It is another specific object of this invention to provide a process for the separation of serum albumin from mammalian blood, plasma, or serum by means of which highly purified serum albumin can be prepared in excellent yields. Further objects and advantages of this invention will appear as the specification proceeds.

This invention is shown in illustrative embodiment in the accompanying drawing, in which—

Fig. 1 is a flow sheet showing the method of the present invention applied to mammalian plasma and in which the optimum quantities of reagents and the optimum operating conditions are set out; and Fig. 2, a graph showing the time and temperature data on heat-stabilized serum albumin in the presence of other plasma proteins.

In one of its phases, this invention comprehends the selective denaturation of serum globulins and other protein constituents of mammalian blood without substantial denaturation of the serum albumin when said proteins are heated in aqueous solution in the presence of a critical concentration of caprylate ions. This invention also involves the carrying out of the indicated selective denaturation under critical pH and temperature conditions to maximize the yield and purity of the recovered serum albumin. Further important features of applicants' invention will become apparent as the specification proceeds.

The blood of mammals is of similar composition. The undissolved solid portion of the blood consists mainly of corpuscles, and the liquid portion of the blood contains a number of different constituents in aqueous solution. The primary dissolved solids in the liquid portion of mammalian blood are proteins of which serum albumin and serum globulin are the major constituents. The weight ratio of serum albumin to serum globulin varies considerably in mammals, but the chemical nature of the albumin and globulin porteins is substantially invariant. The weight ratio of serum albumin to serum globulin varies from as low as 0.6 to 1 in the pig to as high as 3 to 1 in the rabbit. Other mammals fall intermediate between these values. For example, the ratio in a horse is generally about 3.2 to 2.3 of albumin to globulin.

Whole blood contains all of the constituents of natural blood including the corpuscles. Plasma is natural blood minus the corpuscles. Serum is the fluid part of natural blood after it has gone through coagulation. The coagulation of plasma removes mainly the fibrinogen. The corpuscles can easily be removed from whole blood to produce plasma by centrifugation, and the fibrinogen can be easily removed from plasma by coagulation. Therefore, not only whole blood, but also plasma and serum are readily available raw materials for use in preparing serum albumin.

It has been found that the method of this invention is applicable to whole blood, plasma, or serum obtained from mammals. The process is preferably carried out with plasma, but excellent results can also be obtained with whole blood or serum. The fluid part of mammalian blood for use in this process is preferably obtained from domestic animals which are used for meat because of their availability. These include primarily cattle, hogs, and sheep. However, excellent results can be obtained by using the blood or the fluid part thereof of other mammals such as horses, dogs, etc. In other words, it has been discovered that the process of this invention can be advantageously carried out to recover serum albumin from an aqueous solution of mammalian serum albumin and other protein constituents of mammalian blood. As indicated above, the fluid part of mammalian blood contains mainly serum albumin and serum globulin. However, the presence of considerable amounts of other protein constituents of mammalian blood in the aqueous solution such as fibrinogen, hemoglobin, etc., has not been found to interfere with the operation of the process, nor has the presence of corpuscles been found to interfere.

Preferably, the aqueous solution of serum albumin and other protein constituents of mammalian blood for use in this process should not contain substantially over 12% solids. Since the whole blood of mammals may contain up to 22% by weight of solids, it is preferable to dilute the whole blood with water to not over 12% solids before employing it in the present process. Beyond this, the solids concentration of the starting material is not especially critical. However, excellent results are obtained when employing solid concentrations between about 2 to 9% by weight, such as the natural solids concentrations of plasma and serum.

For the purpose of simplicity in the following discussion, the process of this invention will be discussed as applied to plasma. However, it will be understood that whole blood or serum can be used instead of plasma by following the same procedure for plasma, with the exception already discussed that it is desirable to somewhat dilute the whole blood with water before subjecting it to the albumin recovery process of this invention.

The mammalian plasma or other aqueous solution of serum albumin and other protein constituents of mammalian blood is prepared for selective heat denaturation by adjusting its acidity to bring it within a critical pH range, and by incorporating a critical concentration of caprylate ions in the solution. The function of the caprylate ions is not fully understood, but it is believed that they molecularly associate with the serum albumin in such a way as to protect the albumin from heat denaturation. The adjustment of the acidity and the incorporation of the caprylate ions in the plasma can be carried out in any order or simultaneously. However, both the acidity and the caprylate ion molarity of the plasma should be brought within certain critical ranges before the plasma is subjected to heating in the manner subsequently to be described.

One of the important discoveries upon which the present process is based is that in order to obtain highly purified serum albumin in good yields from plasma it is necessary to have the plasma at a pH slightly above or on the alkaline side of the isoelectric point of the serum albumin in the plasma during the heating step in which substantially all of the protein constituents of the plasma except the serum albumin are coagulated. Too high a pH, however, is also undesirable, and in general the pH of the plasma should not be above about pH 5.7. Reported experimental determinations of the isoelectric point of mammalian serum albumin are not entirely in agreement. Reported values range from pH 4.7 to pH 4.9, with the average being about pH 4.8. However, for the purpose of this invention it is believed sufficient that the pH of the solution be above about 4.8 to obtain fairly satisfactory results. It is preferred that the pH of the plasma be adjusted to between about 4.9 to 5.5, and optimum results are obtained when the pH of the plasma is between about 5.0 to 5.2. Various acids and acid salts can be used to adjust the pH of the plasma. Hydrochloric acid is preferred, but other acids and acid salts can also advantageously be employed such as, other mineral acids (sulfuric, phosphoric) and acid salts of the same, as well as certain organic acids (acetic, oxalic).

As indicated above, during the selective heat denaturation step, the plasma should contain a critical concentration of caprylate ion to protect the serum albumin. In general, a caprylate ion molarity of between about 0.0075 to 0.02 M is satisfactory. However, it is preferred that the concentration of caprylate ions in the plasma be between about 0.01 to 0.015 M concentration, and optimum results are obtained when the caprylate ion concentration in the plasma is between about 0.011 to 0.013 M concentration. Since caprylic acid is relatively insoluble in water, it is preferred to introduce the caprylate ions into the plasma by adding a water-soluble salt of caprylic acid to the plasma. The preferred salt for this purpose is sodium caprylate, but other water-soluble salts of caprylic acid can also advantageously be employed, such as other alkali metal salts like potassium caprylate and lithium caprylate.

It will be understood that a sufficient amount of the water-soluble salt of caprylic acid should be added to the plasma to provide the desired molar concentrations of the caprylate ions, as set out above.

After the adjustment of the acidity of the plasma to bring it within the desired pH range, and the incorporation of a water-soluble salt of caprylic acid in the plasma to provide a caprylate ion concentration within the desired range, the plasma is then subjected to heating to selectively denature or coagulate the globulin and other non-albumin protein constituents of mammalian blood. Another important discovery upon which the present invention is based is that the temperature to which the plasma is heated is quite critical for obtaining good yields of highly purified serum albumin. Fairly satisfactory results can be obtained by heating the plasma to temperatures between about 45 to 75° C., but preferably plasma should be heated to temperatures within the range from about 57 to 73° C. Optimum results are achieved by heating the plasma to temperatures between about 65 to 71° C., within which range high yields of albumin can be obtained of from 90 to 96% purity.

If the other conditions are controlled as set out above, the time of heating is not especially critical. However, the plasma should be heated at the desired temperature for at least 20 minutes. At temperatures below 65° C., increasingly longer times will be required to carry out the separation, and at temperatures above 71° C. as the time of heating is increased to 1 hour or more, there is danger of considerable loss of the serum albumin. Therefore, it is preferred to heat the plasma at a temperature between about 65 to 71° C. for at least 20 minutes, and preferably for at least 30 minutes. Within this temperature range, high yields of albumin of 90% or better purity can be obtained by heating for 1 to 2 hours. However, when it is desired to obtain albumin having a purity between about 94 to 96%, a somewhat longer heating time will be required, say about 4 to 6 hours.

The result of this heating step, when it is carried out while the plasma is at a pH within the critical range set out above and while the plasma contains the critical concentration of caprylate ions, is that substantially all of the globulin and other non-albumin protein constituents of the mammalian plasma are coagulated by the heat while only a very small percent of the serum albumin is coagulated. It can therefore be seen that the plasma acidity, caprylate ion concentration, and the temperature at which it is heated all cooperate to bring about the desired result of complete coagulation of the non-albumin proteins without any coagulation of the serum albumin.

Following the heating step, the coagulum, consisting of the denatured globulins and other non-albumin protein constituents of the plasma, can be readily separated from the supernatant containing the dissolved serum albumin by centrifugation, filtration, or any other suitable separation procedure. The centrifugate (supernatant) will then contain the serum albumins in high purity. As indicated above, purities of 90 to 96% are easily obtainable by the method of this invention. Also, recoveries of 75% or more of the serum albumin originally present in the plasma can be obtained.

The purified aqueous solution of serum albumin obtained by the above process can be used directly or further treated to produce serum albumin suited for various specialized uses. For example, if desired, the serum albumin can be recovered from the aqueous solution by drying. Also, if desired, the body salts such as sodium chloride in the aqueous solution can be removed by suitable procedures such as dialysis, or precipitation of the serum albumin followed by its separation from the supernatant containing the body salts. If it is desired to precipitate the serum albumin, this can be done by adding a water-miscible organic solvent to the aqueous solution, such as ethanol.

For purpose of more clearly illustrating the method of this invention, it is desired to set out the following specific examples.

EXAMPLE I

The effect of variations in the temperature and time of heating of plasma treated in accordance with the method of this invention was determined in the following manner:

2.5 liters of citrated bovine plasma was adjusted from pH 7.46 to 4.99 with 158 ml. N HCl; 62.5 ml. of 0.5 molar sodium caprylate was then added. This provided a stock solution from which 100 ml. portions were taken for the time and temperature study. The initial time was taken as the point at which the test solution reached the desired temperature. The test solution was maintained at constant temperature in a water bath whose temperature deviation was ±0.1° C. The coagulum was removed by centrifugation, the centrifugate filtered through a washed D–8 pad, and the nitrogen sample taken from the third quarter of the portion filtered.

The nitrogen determination was utilized as an empirical means of indicating the degree of destruction of the other plasma proteins in the solution, and the temperature at which the albumin was no longer effectively stabilized by the sodium caprylate. The results of these tests are as shown graphically in Fig. 2 of the accompanying drawing. The heavy, straight line indicates the theoretical nitrogen which will yield albumin of 100 percent purity. Theoretical albumin nitrogen computed as 40 percent (electrophoretic analysis) of the original test solution.

The graphical interpretation of the analytical results of these tests, as shown in Fig. 1 of the drawing, confirms the critical nature of the temperatures to which the plasma is heated. In general, these results indicate that the optimum temperature conditions are between about 65 to 71° C., as previously set out in the specification. Much additional specific information can be derived from the graph of Fig. 2. For example, it can be determined by inspecting this graph that albumin of 90% purity is obtainable after 3 hours of heating at 65 to 71° C.; while albumin of 92% purity is obtainable after one-half hour of heat treatment at 71° C.

EXAMPLE II

The following specific procedure is recommended for recovering serum albumin from mammalian plasma such as bovine plasma. The preferred steps are as follows:

(1) Adjust pH of 100 gallons of plant-run citrated bovine plasma (initial pH 7.0–7.4, total solids 9.4%) to 5.05±0.05 by the addition of 3.0 gallons of 2 N HCl (exact amount of acid may be determined on an aliquot). Agitate for 15 minutes after addition of acid.

(2) Add 2.5 gallons 0.5 M sodium caprylate which has been warmed sufficiently to be completely liquefied. The solution of stabilizer is prepared by adding 0.66 lb. of sodium bicarbonate to 0.2 gallon caprylic acid in small portions and diluting to 2.5 gallons.

(3) Agitate the plasma for 15 minutes. Then heat to 152±3° F. and hold at that temperature for 6 hours with ample agitation.

(4) Separate the coagulum by rapid Sharples centrifugation at a rate of 1.3 gallons of centrifugate per minute. Bowl changes are necessary after each 2.6 gallons of centrifugate. Approximately 280 lb. of residue is obtained.

(5) Chill the 66 gallons of centrifugate to 32° F.±2° F. while stirring gently. The stirring is continued while 48 gallons of pre-cooled (23° F.) 95% ethyl alcohol (F–3A) is added slowly to bring the final alcohol concentration to 40%. During the addition, the temperature is allowed to fall so that the system is maintained close to its freezing point until the temperature reaches 23°–20° F. This requires 0.726 gallons of 95% alcohol for each gallon of centrifugate.

(6) Centrifuge at 23° F. in a refrigerated Sharples centrifuge at a rate of 1/8 gallon per minute. This centrifugation removes approximately 46 pounds of albumin paste. Collect 8 pounds per bowl.

(7) Suspend the albumin paste in 20 gallons of cold distilled water (32° F.) and add ½–¾% Standard Celite to the solution and pressure filter through Standard Celite precoated D–2 pads. Dry the filtrate by shell-freezing and drying from the frozen state.

The final product contains 94–96% albumin, and readily dissolves to give a clear solution. Approximately 21 lbs. of powder is obtained which represents 76% of the initial albumin.

EXAMPLE III

Serum albumin was prepared from hog plasma by the following procedure:

Step I

Citrated hog blood (1 volume 4% sodium citrate solution brought to 10 volumes with blood yielded 4.47 liters of hog plasma which was adjusted from pH 7.68 to pH 5.04 with 252 ml. normal hydrochloric acid. All pH's were measured without further dilutions with glass electrodes. After adjustment of the pH, 112 ml. 0.5 M sodium caprylate was added (2.5 ml. per 100 ml. plasma). The solution was agitated for ten minutes. The solution was then raised to a temperature of 65° C.±2° C. and maintained at this temperature for six hours. The coagulum was separated by batch-wise centrifugation in a Sharples centrifuge for one-half hour, 15,000 R. P. M.

Centrifugate, 3180 ml. containing albumin — Coagulum, 1.032 kg. discarded

Step II

Added one-half percent Standard Super Cel to the centrifugate and filtered through a washed D–5 pad. The filtrate was clear, pH 5.2; chilled to —1° C. and addition of 2180 ml. —7° C. 95 percent alcohol commenced. Final temperature of the solution —5° C. This was allowed to stand for 16 hours. Centrifuged at —5° C., 15,000 R. P. M. Sharples centrifuge.

268 gms. (Wet wt.) albumin precipitate — Centrifugate 4,400 l.

Step III

Suspended precipitate in five volumes of 0° C. water 1340 ml. Added 46 ml. of —5° C. 95 percent alcohol (final alcohol concentration approximately 10 percent) and filtered through a washed D–8 pad at —3° C. The filtrate was shell frozen and dried from the frozen state to give 65.0 gms. (dry basis) of product. Electrophoretic analysis on the paste before filtration follows: Veronal buffer, pH 8.6, ionic strength, 0.1.

| Component | Mobility, cm.²/sec. | Percentage |
|---|---|---|
| B$_1$-globulin | 3.62 | 4.0 |
| Albumin | 6.05 | 96.0 |

EXAMPLE IV

Lyophilized sheep plasma was employed as a starting material for the recovery of serum albumin. The lyophilized plasma was originally collected from two liters of mature sheep blood which had 150 ml. of 4% sodium citrate added. The procedure employed was as follows:

Step I

Dissolved 25 gms. lyophilized plasma in 300 ml. water and adjusted from pH 8.92 to 5.10 with 14.3 ml. of normal hydrochloric acid. 7.5 ml. of 0.5 M sodium caprylate was added and the solution agitated for ten minutes. The temperature was then raised to 68° C. and maintained at this temperature for six hours. The coagulum was separated by centrifuging at 4200 R. P. M. for one-half hour in the refrigerated angle, centrifuge.

Centrifugate 118 ml. containing albumin — Coagulum, discarded

Step II

The clear centrifugate, pH 5.60 was cooled to —1° C. and sufficient 95% alcohol —7° C. added to bring the final alcohol concentration to 40%. No precipitate formed. Therefore, the pH was adjusted to 5.02 with normal hydrochloric acid and the resulting precipitate removed by centrifugation, 4200 R. P. M., —5° C., one-half hour.

Albumin precipitate — Centrifugate, discarded

The paste was suspended in 0° C. water, shell frozen and dried from the frozen state to give 2.48 gms. of powder. The dry powder was dissolved in water, filtered through a washed D–8 pad and the composition determined by electrophoretic analysis. Electrophoretic analysis: Veronal buffer, pH 8.6, ionic strength 0.1.

| Component | Mobility, cm.²/sec. | Percentage |
|---|---|---|
| B₁-globulin | 5.68 | 6.6 |
| Albumin | 7.30 | 93.4 |

EXAMPLE V

Serum albumin can be recovered from bovine blood, which may be bovine floor blood (obtained during conventional slaughtering operations), by the following procedure:

Step I

Adjust the pH of the bovine floor blood (initial pH 7.0–7.4 to 5.05±0.05 with N HCl. All pH's measured with glass electrodes; no dilution. After adjustment of the pH, add 2.5 ml. of 0.5 M sodium caprylate per 100 ml. of floor blood. Agitate the solution for ten minutes and then raise the temperature to 67° C.±2° C. and maintain at this temperature for six hours. Separate the coagulum by centrifugation.

```
            |
  _____|_____
 |                     |
Centrifugate      Coagulum, discarded
containing albumin
```

Step II

Adjust the pH of the warm A centrifugate to 4.32±0.05 with N HCl and allow to stand overnight before filtering. Filter initially through a washed D–8 pad if the volume of precipitate is small. The filtrate is clear and no longer contains a red or pink coloration.

```
            |
  _____|_____
 |                     |
Filtrate         Red pigments, discarded
```

Step III

Chill the filtrate to −1° C. and add sufficient −7° C. 95 percent alcohol to obtain a final alcohol concentration of 40 percent and a final temperature of −5° C. Centrifuge at −5° C.

```
            |
  _____|_____
 |                     |
Albumin precipitate  Centrifugate, discarded
```

Suspend precipitate in five volumes of 0° C. water and add sufficient −5° C. 95 percent alcohol to obtain a final alcohol concentration of approximately 10 percent. Filter through a washed D–8 pad at −3° C. Shell freeze and lyophilize. The dry powder will reconstitute to give a clear solution. Electrophoretic analyses on the dry powders follow:

Run #FB6R Veronal buffer, pH 8.6; ionic strength 0.1.

| Component | Mobility | Percentage |
|---|---|---|
| B₁-globulin | 5.24 | 4.3 |
| Albumin | 6.70 | 95.7 |

Run #FB7 Veronal buffer, pH 8.6; ionic strength 0.1.

| Component | Mobility | Percentage |
|---|---|---|
| B₁-globulin | 5.40 | 1.9 |
| Albumin | 6.47 | 98.1 |

The serum albumin recovered by the procedures set out in Examples I to V was subjected to a number of tests to determine whether the chemical, physical and physiological properties of the albumin had been altered by the recovery procedure. The tests showed that there was no alteration in the physical properties of the serum albumin, as indicated by electrophoretic mobility, solubility in alcohol, crystallization characteristics and crystal structure. Test results also indicated that the albumin prepared by the method of this invention is suitable for use in Rh testing.

The process of this invention can also be carried out advantageously even though the aqueous solution of serum albumin contains a small percent by volume of a lower alcohol, such as methanol or ethanol, for example, fibrinogen can be removed from blood by adding ethanol to 4% concentration and adjusting the pH to around 7.3. After the removal of the fibrinogen, the serum can then be processed to obtain the albumin in the manner previously described, since the presence of the 4% concentration of ethanol in the serum has not been found to interfere. However, it is necessary of course to adjust the pH of the serum to within the ranges set out above in order to carry out the recovery process of this invention.

While in the foregoing specification various embodiments of this invention have been set out in considerable detail for purpose of illustration, it will be apparent to those skilled in the art that many of the specific details set forth can be varied widely without departing from the spirit and underlying principles of the present invention.

We claim:

1. In a process for the recovery of serum albumin from an aqueous solution of mammalian serum albumin and other protein constituents of mammalian blood, the steps of selectively denaturing and coagulating said other protein constituents in said solution at a protein solids concentration of not over 12% by heating said solution to a temperature between about 45 to 75° C. while said solution is at a pH on the alkaline side of the isoelectric point of said serum albumin but not over pH 5.7 and while said solution contains between about 0.0075 to 0.02 M concentration of caprylate ions, and then separating the coagulum of said other protein constituents from the supernatant solution of said serum albumin.

2. In a process for the recovery of serum albumin from an aqueous solution of mammalian serum albumin and other protein constituents of mammalian blood, the steps of selectively denaturing and coagulating the proteins in said solution by heating said solution at a protein solids concentration of not over 12% to a temperature between about 57 to 73° C. while said solution is at a pH between about 4.8 to 5.7 and while said solution contains between about 0.0075 to 0.02 M concentration of caprylate ions, and then separating the coagulum of said other protein constituents from the supernatant solution of said serum albumin.

3. In a process for the recovery of serum albumin from an aqueous solution of mammalian serum albumin and other protein constituents of mammalian blood, the steps of selectively denaturing and coagulating the proteins in said solution by heating said solution at a protein solids concentration of not over 12% to a temperature between about 65 to 71° C. while said solution is at a pH between about 4.9 to 5.5 and while said solution contains between about 0.01 to 0.015 M concentration of caprylate ions, and then separating the coagulum of said other protein constituents from the supernatant solution of said serum albumin.

4. The process step of claim 3 in which said aqueous solution consists of whole blood diluted with water to not over 12% solids by weight.

5. The process step of claim 3 in which said aqueous solution is plasma.

6. The process step of claim 3 in which said aqueous solution is serum.

7. In a process for the recovery of serum albumin from the fluid portion of mammalian blood containing serum albumin and other protein constituents including serum globulin and having a protein solids concentration of from 2 to 9%, the steps of selectively denaturing and coagulating said other protein constituents in said fluid portion, including said serum globulin, by heating said fluid portion at a temperature between about 65 to 71° C. while said fluid portion is at a pH between about 4.9 to 5.5 and while said fluid portion contains between about 0.01 to 0.015 M concentration of sodium caprylate, thereby forming a coagulum of said other protein constituents, including said serum globulin, and a supernatant solution of said serum albumin, and then separating said supernatant solution from said coagulum.

8. In a process for the recovery of serum albumin from the fluid portion of mammalian blood containing serum albumin and other protein constituents including serum globulin and having a protein solids concentration of from 2 to 9%, the steps of selectively denaturing and coagulating said other protein constituents in said fluid portion, including said serum globulin, by heating said fluid portion at a temperature between about 65 to 71° C. for at least 20 minutes while said fluid portion is at a pH between about 5.0 to 5.2 and while said fluid portion contains between about 0.011 to 0.013 M concentration of sodium caprylate, thereby forming a coagulum of said other protein constituents, including said serum globulin, and a supernatant solution of said serum albumin, and then separating said supernatant solution from said coagulum.

References Cited in the file of this patent

UNITED STATES PATENTS 2,705,230    Reid _____ Mar. 29, 1955

OTHER REFERENCES

Anson et al.: "Advances in Protein Chem.," vol. IV, pp. 82–85 (1948).

Cohn: Chem. Reviews, vol. 28, pp. 402–3 (1941).

Boyer et al.: J. Biol. Chem., vol. 162, 1946, pp. 181–98.